(12) United States Patent
Zagrodzki

(10) Patent No.: US 6,484,853 B1
(45) Date of Patent: Nov. 26, 2002

(54) SINGLE SIDED FRICTION ASSEMBLY COMPENSATING FOR THERMAL DISTORTIONS

(75) Inventor: Przemyslaw A. Zagrodzki, West Lafayette, IN (US)

(73) Assignee: Raytech Composites, Inc., Indianapolis, IN (US)

( * ) Notice: Subject to any disclaimer, the term of this patent is extended or adjusted under 35 U.S.C. 154(b) by 0 days.

(21) Appl. No.: 09/854,780

(22) Filed: Aug. 15, 2001

(51) Int. Cl.[7] ............................................... F16D 55/36
(52) U.S. Cl. ................... 188/71.5; 188/264 R; 188/71.6
(58) Field of Search ................. 188/71.5, 71.6, 188/218 XL, 26, 18 A, 58, 264 R, 264 G

(56) References Cited

U.S. PATENT DOCUMENTS 2,971,612 A * 2/1961 Graber ....................... 188/71.5
3,094,194 A * 6/1963 Kershner ................... 188/71.5
5,553,689 A * 9/1996 Chareire .................... 188/71.5
5,765,673 A * 6/1998 Nishiyama et al. ........ 188/71.5

* cited by examiner

Primary Examiner—Matthew C. Graham
(74) Attorney, Agent, or Firm—Pyle & Piontek

(57) ABSTRACT

A single sided friction assembly is provided in which an annular ring of friction material is provided on only one side of a relatively heat conductive metallic core plate, with the rings facing the same direction, and the ring of friction material engaging the rear bare metal side of an adjacent disk. An actuator is provided to bring the assembly into frictional engagement. Modifications are made at one and preferably both ends of the assembly to accommodate thermal deformations of the disks.

12 Claims, 5 Drawing Sheets

SINGLE SIDED FRICTION ASSEMBLY COMPENSATING FOR THERMAL DISTORTIONS

BACKGROUND OF THE INVENTION

This invention relates to drive assemblies comprising a plurality of friction disks and reaction disks arranged along a common axis and which can be brought into and out of axial engagement to perform a clutch or braking function. These assemblies are usually installed in a housing having a linear actuator at one end of the assembly and a axially fixed wall or surface at the other end. The assemblies are commonly used in automobiles, trucks and other land vehicles, as well as stationary power transmissions.

One known type of friction assembly comprises a plurality of circular friction disks having a central opening and being slidably mounted on a central shaft or other central element, together with bare metallic reaction disks interleaved with the friction disks. Alternating disks have respective inner and outer splines engaged with a central element such as a shaft and an outer element. Each friction disk comprises a relatively rigid core plate made of steel and having an annular ring of relatively thermally nonconductive friction material bonded to both sides of the core plate. In a clutch, the alternating disks move at different rotational speeds while disengaged, and move at the same speed upon engagement. In a brake, one of the alternating disks is fixed with respect to the housing in which the brake is mounted. The other disks rotate when the brake is disengaged and do not rotate when they are engaged. These assemblies typically operate in a liquid lubricant to provide cooling.

In the above type of conventional assembly, alternating disks carry a ring or annular band of friction material on both sides, and bare metal reaction disks are interleaved between the friction disks, with the bare metal surface on each side of the reaction disk being brought into sliding engagement with a ring of friction material from a friction disk.

Another type of assembly is known as a single sided assembly in which each disk carries a ring of friction material on one side only facing in the same axial direction. Upon engagement, the friction material ring of one disk engages the bare metal surface of an adjacent disk, which provides a heat sink for absorption of heat.

In a double sided design, heat does not penetrate to the steel core of the friction disk since it is protected on both sides by low conductive friction material. Therefore, the core plates of the friction disks do not contribute much to heat sink, and the only contributors are the bare metal reaction disks. By contrast, in the single sided design, each piece of metal inside the pack is exposed to heating and can be considered as being more effective than in the double sided design. The advantages of a single sided assembly are that such assemblies allow a reduction of overall thickness of the pack of disks or an increase in capacity of the same overall thickness, as well as a reduction of temperature for the same overall thickness.

The most critical stage of clutch and brake operation is the engagement phase which starts when the alternating disks move at different rotational speeds. During this phase the actuator force is being applied to the disk assembly in order to produce frictional torque and thereby reduce the initial speed difference. Both the sliding and the frictional torque occur simultaneously during this stage and it results in generation of significant amount of frictional heat. The disks are being exposed to high thermal loads which substantially contribute to material wear and which are the major cause of failures of these parts.

Double sided assemblies are often considered as being more robust than single sided assemblies. Thus, there is a continuing need to improve the performance of single sided assemblies in view of the benefits associated therewith. A reduction in overall thickness in tightly packed transmissions is often considered as an important and valuable advantage.

SUMMARY OF THE INVENTION

In accordance with the present invention, a single sided friction disk assembly is provided, and a modification is made at one or both ends of the assembly to cause more uniform contact between the first and second disks and the remaining disks in the series, thereby resulting in more uniform heating and reducing thermal stress and thermoelastic deformations. These modifications help to avoid a concentration of the contact pressure at the mean radius of the first and relatively cool disk, whose bare metal surface is not engaged by another disk, and the second disk in the assembly, which is engaged by the first disk, as will be described in more detail herein. The end disks are supported in a manner to accommodate or allow normal thermoelastic deformation, with essentially no support being provided in a zone of mean radius between the inner and outer circumference of the first disk.

In one preferred embodiment, the actuator or part which engages the first disk is provided with an annular groove which is smaller in width that the ring of friction material on the other side of the disk. The same effect can be achieved by applying a pair of radially spaced support rings on the rear or metal side of the first disk. This allows the first disk to assume the thermally deformed shape of the second disk.

In addition, a modification may be made at the other end of the assembly, or the end which faces the friction rings on the disks. In this embodiment, a support ring is provided on the axially fixed wall or the axially moved end reaction plate of the assembly. This support ring is smaller in width than the width of the annular friction rings on each disk, so that the entire assembly is allowed to assume a concave shape relative to the support.

As used herein, the term "width" refers to the radial dimension between the outer and inner circumferences of the ring of friction material, and the reduction in width means a reduction in outer diameter and/or increase in the inner diameter. These changes are normally equal in magnitude but may differ somewhat to compensate for a particular assembly.

In summary, the present invention is directed broadly to single sided friction disk assemblies in which interleaved bare metal reaction plates are eliminated and an annular ring of friction material on one disk engages the rear metal surface of an adjacent disk. The axially movable disks are mounted between a pair of end supports, one of which is axially fixed and the other being axially movable to compress and release the disk assembly. Upon engagement, at least some of the disks thermally deform, assuming a concave shape at the mean diameter on the friction material side between the inner and outer diameter of the annular friction ring. Means are provided at or near one and preferably both end supports to allow this thermal deformation to occur without interference from the end supports.

DETAILED DESCRIPTION

Figure 1:
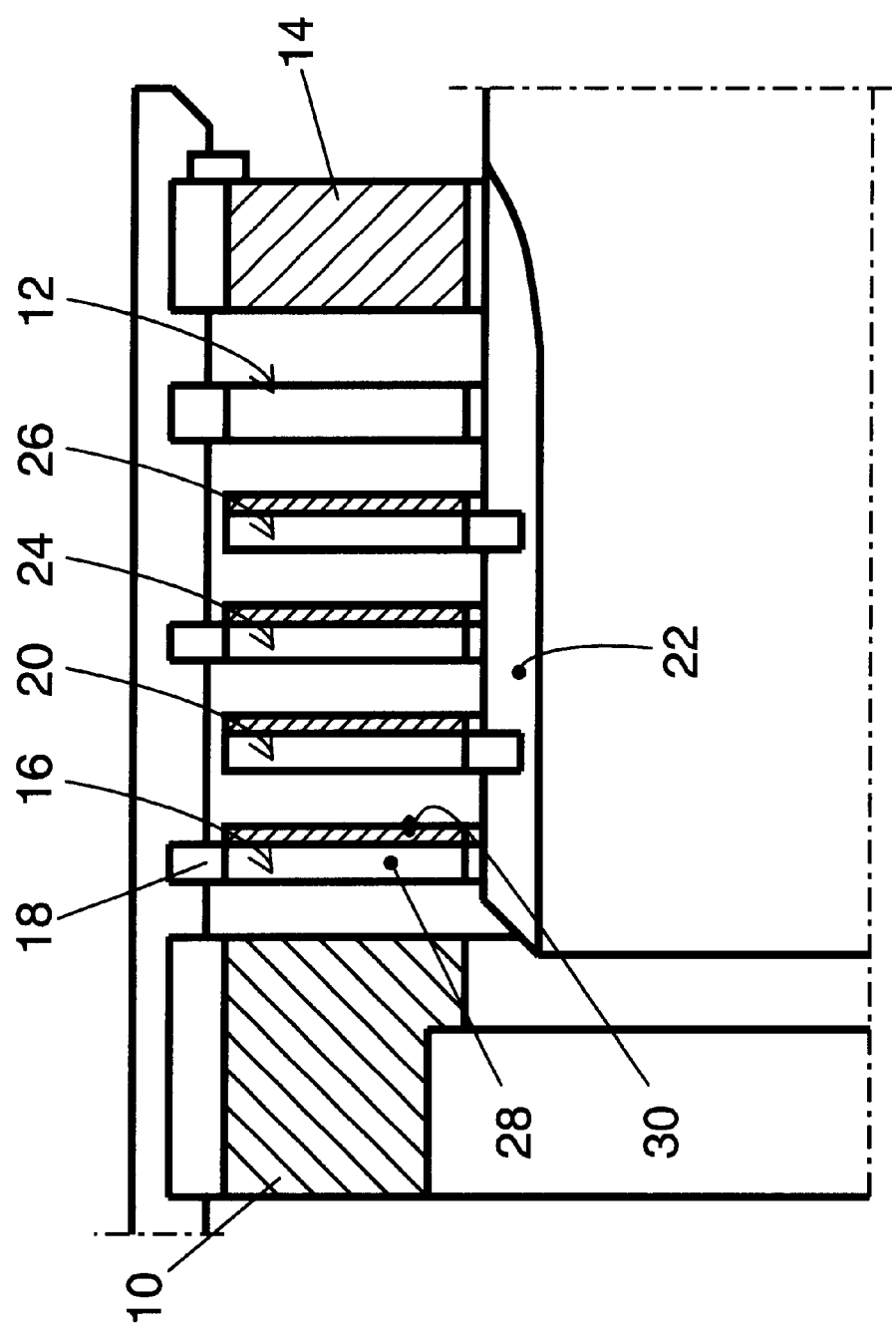
FIG. 1 is a schematic sectional view of the upper half of a single sided friction disk assembly, prior to any modifications.
Figure 2:
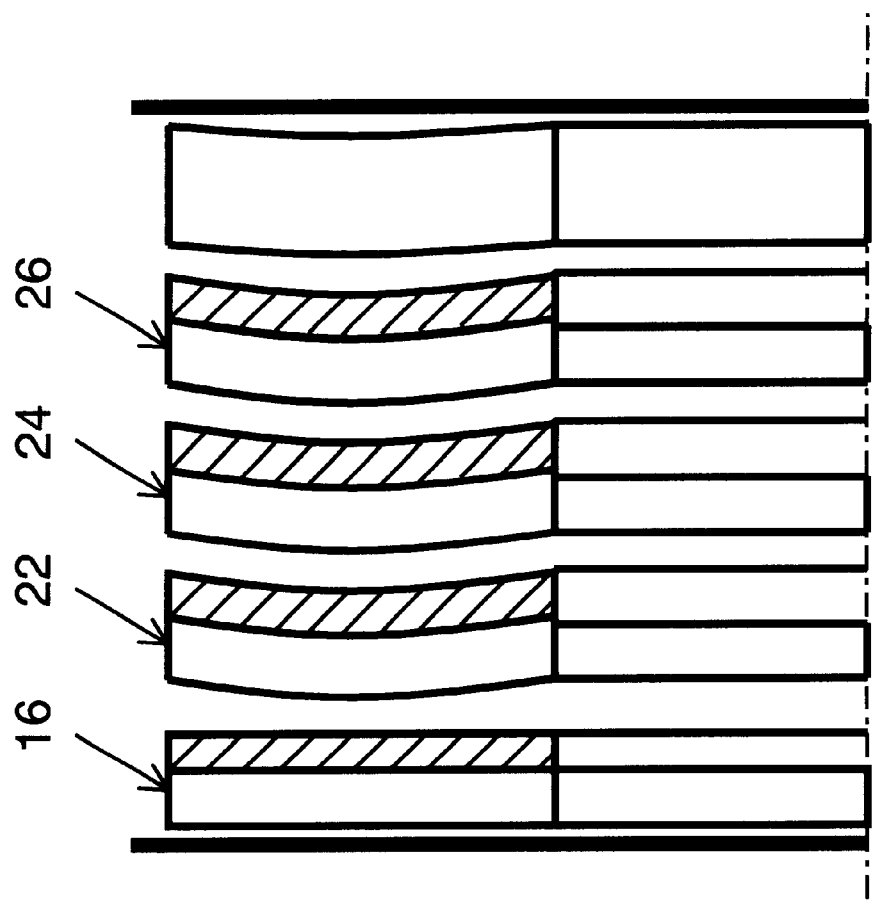
FIG. 2 is a schematic sectional view of the assembly shown in FIG. 1 showing the thermally deformed shape of the friction disks during a single engagement.

FIGS. 1 and 2 show an example of a single sided friction assembly and the thermal deformation which occurs during sliding engagement of the friction disks.

The assembly includes an axial actuator such as a piston or piston head which is generally shown at 10, although the actuator can be located at either end of the assembly. The other end of the assembly comprises a bare metal reaction disk 12 movable against an axially fixed end wall 14, or the reaction disk can be omitted. In the embodiment shown, the piston head 10 engages a first friction disk 16, which is rotationally stationary relative to the outer part of the device and has an outer spline 18 engaged with the outer part. The second friction disk 20 rotates relative to first friction disk 16 and is internally splined to a central member such as a shaft 22. The remaining disks such as 24 and 26 alternate in the same manner. It will be appreciated that only the upper half of the assembly is shown, and each friction disk is ring shaped or circular and comprises a metal core plate 28 and a ring of friction material 30 on one side of each plate, with the friction material rings on the plates facing the same axial direction and in the embodiment shown, away from the actuator. The actuator moves from left to right as shown in the drawing to cause compression and engagement of the entire assembly, with the friction ring of one disk engaging the bare metal surface of an adjacent disk in the series, and resulting in the generation of heat due to sliding friction upon engagement.

In an ideal situation, each disk in the assembly would remain planar or in the same shape during engagement, allowing for even sliding pressure or engagement and uniform generation of heat. This is however, not found to be the case in actual practice. As shown in FIG. 2, the first disk 16 is not itself engaged by a friction disk and remains cool relative to the other disks 22, 24, and 26, which thermally deform and assume a convex shape between their inner and outer peripheries relative to the first disk, during a single engagement. The deformation occurs because the bare metal surface of the disk transmits heat more than the side carrying the ring of friction material, which is typically thermally low-conductive. As a consequence, temperature distribution in the core plate is non-symmetric with respect to its mid-plane, with highest temperature at the bare metal surface; consequently, the layer of material at this bare metal surface experiences higher thermal expansion than the remaining portion of the core plate. This results in cupping of the working portion of the disk as shown, with the cupping being convex relative to the first disk and causing non-uniform contact between the first and second disks. The uneven contact pressure may result in creation of band shaped hot spots. Similar deformation occurs in subsequent disks in the pack.

Figure 3:
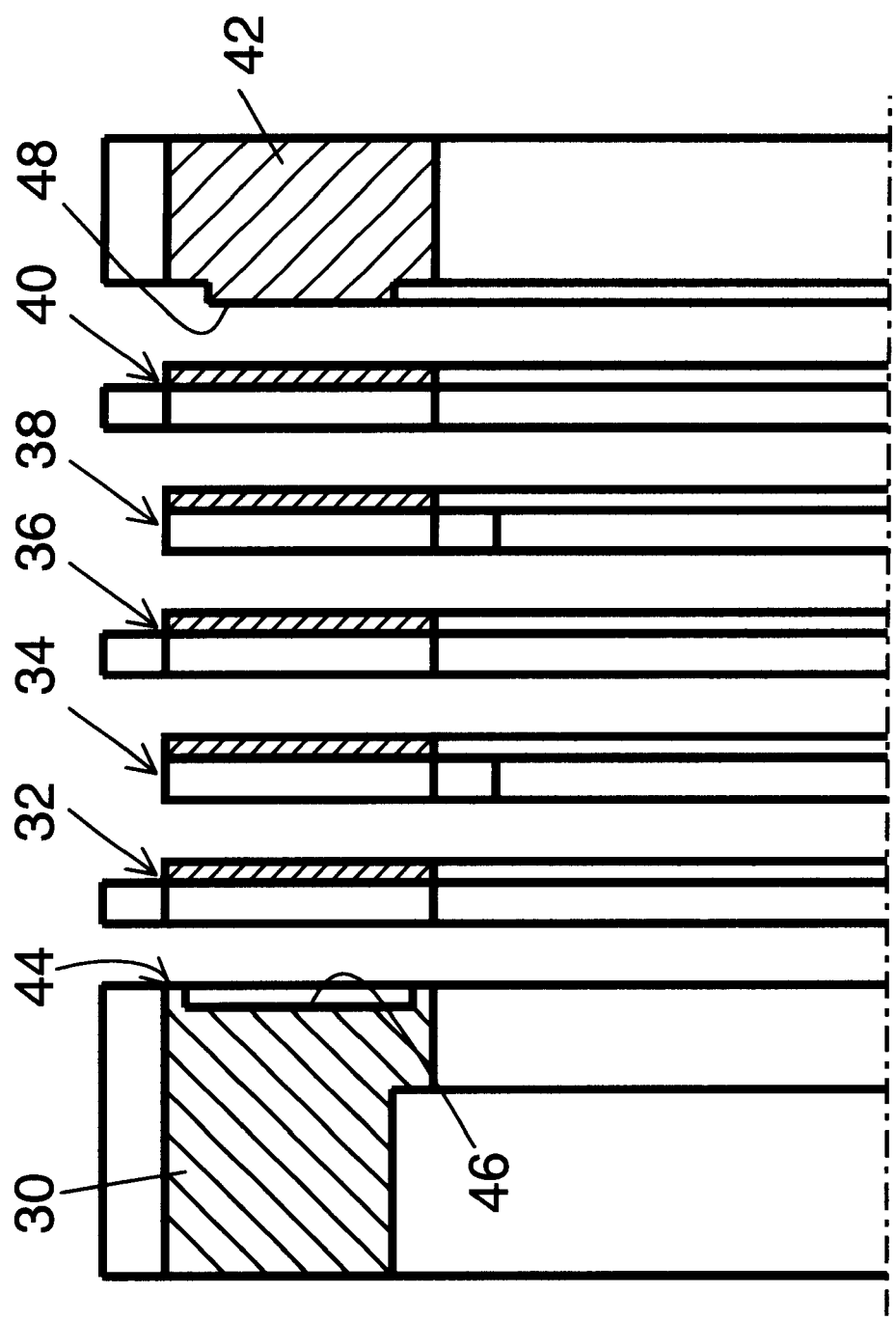
FIG. 3 is a schematic sectional view of the assembly shown on FIG. 1 together with modifications to both ends of the assembly in accordance with the present invention.

FIG. 3 shows the improved single sided friction disk assembly comprising an axially movable member, such as a piston head 30, a first friction disk 32 and four additional disks 34, 36, 38 and 40 in series, followed by an axially stationary end wall 42. In the embodiment shown, the first disk 32, middle disk 36 and last disk 40, do not rotate with respect to the piston and end wall 42, and the other disks 34 and 38 rotate relative to the piston and end wall.

Also, in the embodiment shown, the actuator 30 has a surface 44 which engages the rear bare metal surface of the first disk 32 in a static fashion, and this surface is normally planar. In accordance with the present invention, an annular groove 46 is formed in the surface 44 facing the rear or bare metal surface of the first disk. It may be seen that the width of the annular groove 46 is less than the width of the ring of friction material and the portion of the metal disk supporting the friction material of the first disk. When the actuator is brought into engagement with the first disk, no force or pressure is applied near the mean radius (between the inner and outer radius) of the first disk, allowing it to assume a convex shape relative to the actuator and to assume a shape corresponding to the remaining and relatively hot disks in the series, which are instantaneously thermally deformed as shown in FIG. 2. The depth and inner and outer diameters of the groove or recess 46 is sufficient to accommodate thermal deformation of the other disks, causing more uniform contact between adjacent disks and more uniform distribution of the dissipation of heat in the assembly. Also, as shown in simulated test results, the modifications provide more uniform contact between the remaining disks and thereby reduce thermal stress.

Another type of modification is possible to the other end of the assembly, such as at the end wall 42, as shown in FIG. 3, which when employed as a reaction surface, is normally planar. In this embodiment, however, the end wall 42 has an annular boss 48 which is in axial alignment with the end friction disk 40 but has an outer diameter which is less than the friction material and an inner diameter greater than the friction material. The annular boss 48 may be an integral part of end wall 42 or may be separately secured to the wall. In addition, the reaction disk 40 is equipped with a layer of compliant material secured to the surface facing the boss and being in static contact with the boss upon engagement in order to provide more uniform pressure distribution between non-coextensive surfaces. As a compliant material, a friction material can be used and in this case the end reaction plate, which is normally a bare metal disk, can simply be replaced with a friction disk. Unlike in regular friction disks, the friction material of this disk does not slide against the counter-surface. The boss 48 is complementary to the groove 46, in that it allows the friction disks to thermally distort while maintaining even engagement.

Figure 4:
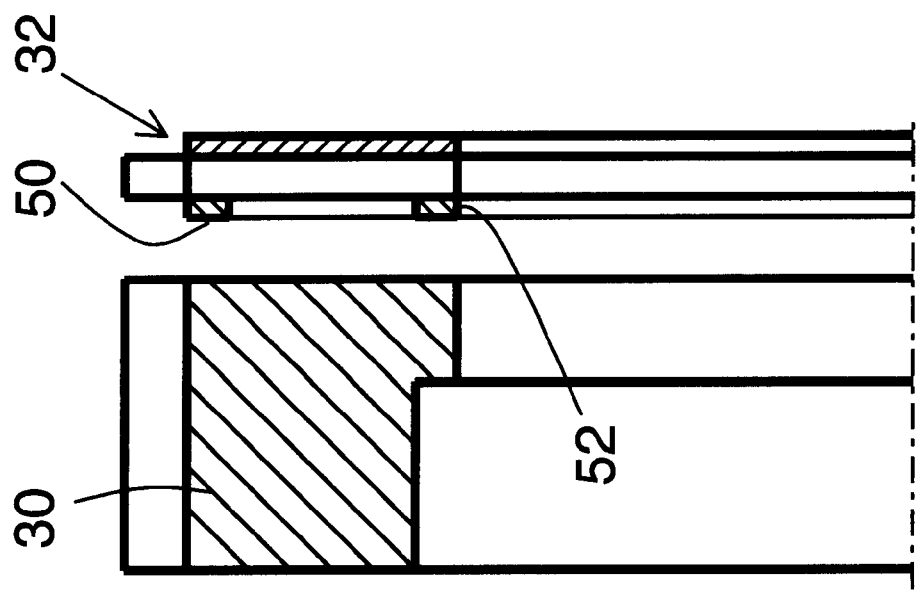
FIG. 4 is a schematic sectional view of the first disk shown in FIGS. 1–3 with an alternative modification.

FIG. 4 shows a modification having the same effect as the groove 46 facing the first disk 32 but wherein the engaging end of the actuator remains planar. In this embodiment, a pair of spaced concentric rings, or outer ring 50 and inner ring 52 are secured to the rear of the metal face of the first disk 32 at or near the inner and outer peripheries of the disk. Engagement allows the first disk to deform to the same shape as the other disks. The rings can be made of any suitable material such as metal or a compliant friction material.

Figure 5:
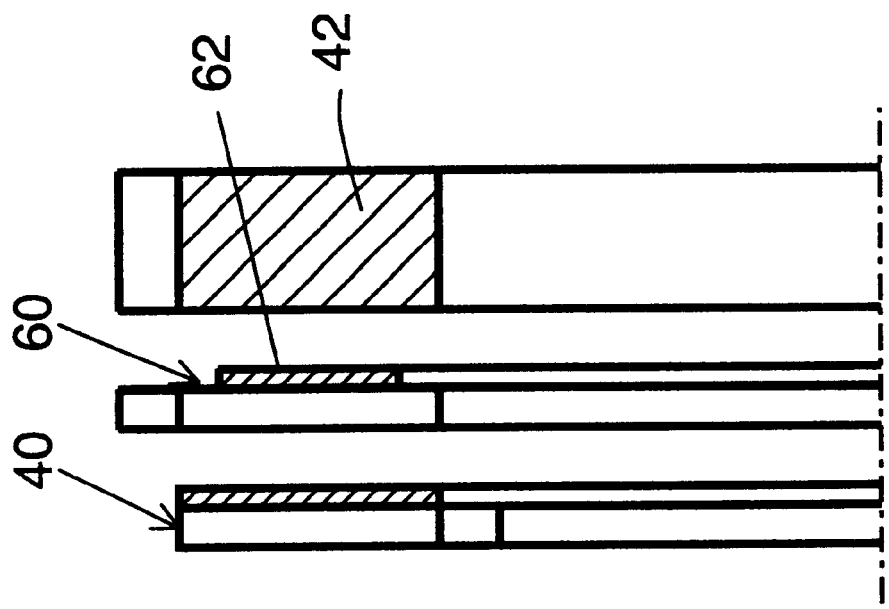
FIG. 5 is a schematic sectional view of the right hand portion of the assembly of FIG. 1 with an alternative modification to the final reaction plate.

FIG. 5 shows another possible modification of the right hand end of the assembly, as shown in the drawings, in which a final reaction plate 60 is employed and carries a ring of friction material 62 on the side of the disk facing the planar end wall. It will be seen that the friction material 62 is narrower or has an outer diameter which is less than the friction ring on the adjacent disk 40, an inner diameter greater than the friction ring, and serves the same function as the annular boss shown in FIG. 3. The disk 62 may be made from any suitable material such as friction material or another compliant material.

The term "friction material" as used herein contemplate any of the types known in the art. Friction materials comprise specially designed sheets which can be formed or cut into rings and bonded to the core plate. One type of material comprises fibers bonded with a resin and being durable at elevated temperatures.

In summary, it will be appreciated that the modification made to the end or ends of the disk assembly are for the purpose of accommodating thermoelastic deformations between disks in the assembly, and in particular, to thermal deformations which are peculiar to single sided disk assemblies. This prevents or reduces non-uniform distribution of heat flux (heat per unit time per unit area), which would otherwise cause high thermal stresses.

In addition, it will be appreciated that the concepts of the present invention are easily adaptable to configurations, other than the configurations described herein, wherein the actuator and end plate are rotationally fixed to the other element. For example, the invention is applicable to an inverse configuration wherein the actuator and end plate are fixed relative to the inner element. Other suitable configurations would include those in which the actuator is fixed to the outer element and the end plate to the inner element, or vice versa.

Also, in the preferred embodiment, a modification is made at both ends of the assembly for best performance, with the modifications serving to complement each other in a reciprocal manner. Also, although a particular embodiment has been shown, it will be appreciated that the linear actuator may be placed at either end of the assembly, as long as the groove faces the bare metal surface of a first disk, and the boss faces the friction material rings.

What is claimed:

1. A friction assembly comprising a plurality of friction disks slidably mounted along a common axis with alternating adjacent disks being frictionally reactive, means for bringing said disks into frictional engagement, each friction disk comprising a metal core plate having a central opening and an annular ring of friction material secured to said plate only on one side thereof, said friction material rings facing in the same axial direction, a first outermost disk in said assembly having its bare core plate facing outwardly, a metal surface statically engageable with the bare metal core of said first disk, said first disk remaining cool relative to other friction disks upon engagement, with said other disks undergoing thermoelastic deformation relative to said first disk and causing uneven contact pressure between disks, and means for allowing said first disk to conform with the other disks during engagement.

2. The friction disk assembly of claim 1 wherein the means for bringing said disks into frictional engagement comprises an axial actuator engageable with the metal backing plate of the first disk, said actuator being operable to allow said first disk to distort into a convex shape.

3. The friction disk assembly of claim 2 wherein said first disk and its associated core plate and annular ring of friction material have an inner and outer periphery, and wherein said actuator applies compressive force to the core plate only near said inner and outer periphery.

4. The friction disk assembly of claim 2 wherein said actuator comprises circular groove having a width narrower than the width of the annular ring of friction material on said first disk.

5. The friction assembly of claim 2 wherein a pair of concentric spaced rings are provided on the core plate of the first disk, the width between said rings being narrower than the width of the annular ring of friction material on said first disk.

6. The friction disk assembly of claim 1 wherein said assembly comprises a last disk and means facing said last disk for allowing said last disk to conform with the other disks during engagement.

7. The friction disk assembly of claim 6 wherein said means facing said last disk comprises an axially fixed boss, said axially fixed boss having an outer diameter less than the annular ring of friction material on said last disk and an inner diameter greater than the ring of friction material on said last disk.

8. A friction disk assembly, said assembly comprising a plurality of axially aligned friction disks, each of said friction disks comprising a metal disk and a ring of friction material secured to only one side of the metal disks with the ring of friction material of each disk facing in the same axial direction, and a bare metal surface on the other side of the disks, first and second end surfaces disposed at the ends of the assembly, one of said end surfaces being axially movable to bring the rings of friction material on each disk into frictional engagement with the bare metal surface of an adjacent disk, with alternating disks being rotable relative to adjacent disks to transfer energy upon engagement, a first and second disk in said series, the bare metal surface of said first disk not being engaged by an adjacent disk and being statically engaged by a metal surface and remaining cool relative to said second disk, which is thermally deformed upon engagement, and means associated with said first disk for allowing said first disk to conform to the thermally distorted second disk.

9. The friction assembly of claim 8 wherein said second and subsequent disks thermally deform in a cup shaped fashion at the mean radius of the friction ring, and a wherein said first disk is unsupported in a zone corresponding to the mean radius to allow conformance with the second disk.

10. The friction assembly of claim 9 wherein a circular groove is provided in the end surface facing the metal surface of the first disk, with width of said groove being smaller than the width of the friction ring on said first disk.

11. The friction assembly of claim 9 wherein a pair of concentric rings are provided on the metal surface of the first disk, with the width between the bands being smaller than width of the friction ring on said first disk.

12. The friction assembly of claim 8 wherein the end disk opposite the first disk is provided with a protrusion narrower than the rings of friction material on the disks in the assembly, said protrusion having a width narrower than said rings of friction material.

* * * * *

UNITED STATES PATENT AND TRADEMARK OFFICE
CERTIFICATE OF CORRECTION

PATENT NO. : 6,484,853 B1
DATED : November 26, 2002
INVENTOR(S) : Przemyslaw A. Zagrodzki It is certified that error appears in the above-identified patent and that said Letters Patent is hereby corrected as shown below:

<u>Title page,</u>
Item [54], cancel present title and substitute the following title:

-- SINGLE SIDED FRICTION ASSEMBLY HAVING IMPROVEMENTS FOR COMPENSATING THERMAL DISTORTIONS IN THE ASSEMBLY --

<u>Column 6,</u>
Line 44, delete "a" before "wherein"

Signed and Sealed this

Eleventh Day of March, 2003

JAMES E. ROGAN
*Director of the United States Patent and Trademark Office*